United States Patent [19]

Obayashi et al.

[11] Patent Number: 4,880,888
[45] Date of Patent: Nov. 14, 1989

[54] PROCESS FOR PRODUCING A WATER-ABSORBENT RESIN

[75] Inventors: Shigeji Obayashi, Akashi; Morio Nakamura, Kakogawa; Takushi Yamamoto, Himeji; Hitoshi Tanaka, Himeji; Yuji Sakamoto, Himeji, all of Japan

[73] Assignee: Seitetsu Kagaku Co., Ltd., Japan

[21] Appl. No.: 238

[22] Filed: Jan. 5, 1987

[30] Foreign Application Priority Data

Jan. 25, 1986 [JP] Japan ............ 61-14307

[51] Int. Cl.$^4$ .................... C08F 2/00
[52] U.S. Cl. ................. 526/209; 526/216; 526/240; 525/383
[58] Field of Search ......... 526/209, 216, 240; 525/383

[56] References Cited

U.S. PATENT DOCUMENTS

| | | |
|---|---|---|
| 3,940,351 | 3/1971 | Schlatzer, Jr. |
| 3,975,280 | 8/1976 | Hachmann et al. ............ 427/221 |
| 4,093,776 | 6/1978 | Aoki et al. ............ 526/207 |
| 4,133,857 | 1/1979 | Takano et al. ............ 562/580 |
| 4,340,706 | 7/1982 | Obayashi et al. ............ 526/311 |
| 4,367,323 | 1/1983 | Kitamura et al. ............ 526/317.1 |
| 4,446,261 | 5/1984 | Yamasaki et al. ............ 524/37 |
| 4,507,438 | 3/1985 | Obayashi et al. ............ 525/119 |
| 4,541,871 | 9/1985 | Obayashi et al. ............ 525/119 |
| 4,683,274 | 7/1987 | Nakamura et al. ............ 526/200 |

OTHER PUBLICATIONS

EP-A-0 107 062, Yeats et al.

Primary Examiner—Joseph L. Schofer
Assistant Examiner—N. Sarofim
Attorney, Agent, or Firm—Pollock, Vande Sande & Priddy

[57] ABSTRACT

A water-absorbent resin having excellent physical properties can be produced by a process wherein an aqueous solution containing an $\alpha,\beta$-unsaturated carboxylic acid and an alkali metal salt thereof in a total amount of 25% by weight or more is subjected to polymerization with a radical polymerization initiator in a petroleum-based hydrocarbon solvent in the presence or absence of a crosslinking agent, characterized by using, as a surfactant, a polyglycerine—fatty acid ester having an HLB of 2 to 16 and represented by the general formula

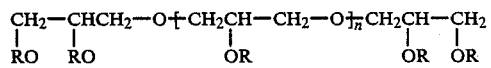

(wherein R is an acyl group or hydrogen atom and n is an integer of 0 to 8).

13 Claims, No Drawings

PROCESS FOR PRODUCING A WATER-ABSORBENT RESIN

This invention relates to a process for producing a water-absorbent resin. More particularly, the present invention relates to a process for producing a water-absorbent resin having excellent properties as a water-absorbent agent for use particularly in the field of sanitary materials.

In recent years, water-absorbent resins have been used in the field of sanitation as menstrual articles, diaper, disposable house-cloth and the like, as well as in the field of agriculture and horticulture as water retentive materials and soil improvers. Further, they are useful in other various fields such as coagulation of sludges, prevention of dew condensation on construction materials, dehydration of oils and so on. They have been widely used particularly in the field of sanitation as menstrual articles, diaper, disposable house-cloth and the like. In this case, since they are brought in direct contact with human body, great importance has been placed on the safety of water absorbent resins.

In general, requirements for physical properties of water-absorbent resins include water absorbency, water absorption rate, gel strength after water absorption, shape and compatibility with other materials used together. Good water-absorbent resins are those satisfying not only these physical properties, but also safety.

As such water-absorbent resins, there are known high molecular resins which are crosslinked slightly. Their examples include crosslinked carboxymethyl cellulose, crosslinked polyethylene oxide, crosslinked hydrolyzate of starch-acrylonitrile graft copolymer, crosslinked polyacrylic acid salt and crosslinked vinyl alcohol-acrylic acid salt copolymer. Of these water-absorbent resins, crosslinked hydrolyzate of starchacrylonitrile graft copolymer has a relatively high water absorbency. However, since it contains starch which is a natural high molecular substance and causes putrefactive decomposition, its storage over a long period of time is difficult. Moreover, its production process is complicated. With respect to crosslinked carboxymethyl cellulose and crosslinked polyethylene oxide, there has been available no product which has a satisfactory water absorbency. Crosslinked vinyl alcohol-acrylic acid salt copolymer has a relatively high water absorbency. However, its production process is complicated and causes a high cost.

In contrast, crosslinked acrylic acid salt polymer has a high water absorbency and can be prepared from the starting material, acrylic acid which is readily available commercially, and hence can be produced at a uniform quality and inexpensively, and furthermore causes no putrefaction; thus, crosslinked acrylic acid salt polymer has many advantages and is said to be the most desirable water-absorbent resin.

As a process for polymerizing acrylic acid or an alkali metal acrylate, there are known bulk polymerization process, aqueous solution polymerization process, inverse emulsion polymerization process, inverse suspension polymerization process, etc. In processes other than inverse emulsion polymerization process and inverse suspension polymerization process, polymerization in an ordinary polymerization reactor is difficult because removal of the heat generated during polymerization is difficult and the polymerization mixture has an extremely high viscosity, and further it is difficult to obtain a product in powder state.

A process for producing a powdery polymer from an $\alpha, \beta$-unsaturated carboxylic acid (or a salt thereof) in accordance with inverse emulsion polymerization process or inverse suspension polymerizatin process is disclosed and known in Japanese Patent Publication No. 10644/1959, Japanese Patent Publication No. 30710/1979, Japanese Patent Application Kokai (Laid-Open) No. 26909/1981, etc. In order to carry out such a process, selection of an appropriate surfactant is necessary. This selection is very important with regard to stabilization of W/O type suspension and control of the particle size of the polymer.

As said surfactant, there are known sorbitanfatty acid esters (e.g. sorbitan monostearate and sorbitan monopalmitate), sorbitol-fatty acid esters (e.g. sorbitol monostearate) and so forth. When inverse emulsion polymerization or inverse suspension polymerization is conducted using such a surfactant, the polymer obtained becomes very fine powders having particle diameters as small as 100 to 10 $\mu$m. Therefore, in handling such powdery polymers, it becomes necessary to set up a countermeasure for dust.

Such very fine powders are liable to form unswollen powder lumps when the powders absorb a liquid to be absorbed, resulting in insufficient absorption. Moreover, when such a water-absorbent polymer in fine powder form is mixed with or attached to a pulverized pulp, a nonwoven cloth or the like, the polymer is liable to come off therefrom.

When inverse suspension polymerization is conducted using a surfactant having an HLB of 8 to 12 as described in Japanese Patent Publication No. 25045/1985, such as sorbitan monolaurate, the polymer obtained becomes granular powders having particle diameters of 100 to 500 $\mu$m. This solves the above mentioned drawbacks; however, a large amount of the polymer adheres to the inside wall of a polymerization reactor during polymerization, and it is not satisfactory in view of stable operation.

As other inverse suspension polymerization processes, there are known processes disclosed in Japanese Patent Application Kokai (Laid-Open) Nos. 158209/1982 and 158210/1982, etc. High molecular surfactants used in these processes melt at the time of drying the formed polymer in an ordinary manner and induce partial or entire conversion of the polymer into lumps or adhesion of the polymer to the wall of a drier. Therefore, the processes cannot be said to be satisfactory.

Surfactants used in accordance with the processes described in Japanese Patent Application Kokai (Laid-Open) Nos. 98512/1982 and 98513/1982, etc. are not easily available commercially, and the water-absorbent resins produced therewith are not sufficient in safety.

The present inventors have made an extensive study on a process for stably producing a highly water-absorbent resin which is free from the above mentioned drawbacks of the conventional arts, which has a large average particle diameter, which is high in water absorbency and water absorption rate, and which has a sufficient gel strength and is excellent in safety. As a result, the present invention has been completed.

That is, the present inventors have investigated in detail on the production of a water-absorbent resin based on the above mentioned inverse suspension polymerization process and as a result, have found that a highly water-absorbent resin having excellent characteristics as mentioned above can easily be obtained by using a polyglycerine—fatty acid ester as a surfactant. Based on this finding, the present invention has been completed.

The safety of the polyglycerine—fatty acid ester used as a surfactant in the present invention will be described in detail.

A polyglycerine—fatty acid ester has no toxicity irrelevantly to the molecular weights of the polyglycerine and the fatty acid and, when ingested into human body, is completely decomposed into the polyglycerin and the fatty acid. The polyglycerine is not accumulated in the body and is excreted as it is, together with urine. The fatty acid is absorbed by the body. Hence, polyglycerine—fatty acid esters can be used in foods in an unrestricted amount and are actually used widely as a food additive.

Further, said esters, having excellent biodegradability and safety, provide no fear of environmental pollution and phytotoxicity. Furthermore, being unstimulating and protective to human eyes and skin, the polyglycerine—fatty acid esters give no particular problem when water-absorbent resins produced therewith are used in the field of sanitation as articles coming in frequent contact with human body such as diaper, menstrual articles and the like.

The present invention provides a process for producing a water-absorbent resin wherein an aqueous solution containing an $\alpha,\beta$-unsaturated carboxylic acid and an alkali metal salt thereof in a total amount of 25% by weight or more is subjected to polymerization with a radical polymerization initiator in a petroleum-based hydrocarbon solvent in the presence or absence of a crosslinking agent, characterized by using, as a surfactant, a polyglycerine—fatty acid ester having an HLB of 2 to 16.

As the $\alpha,\beta$-unsaturated carboxylic acid used in the present invention, there can be cited acrylic acid and methacrylic acid. If necessary, a part of these acids can be replaced with other polymerizable carboxylic acids such as itaconic acid, crotonic acid, maleic acid, fumaric acid or the like.

As the alkali metal salt, there can be cited salts of sodium, potassium, lithium, etc. In particular, the sodium salt is preferable in view of safety because polysodium acrylate is approved as a food additive.

The aqueous solution of an $\alpha,\beta$-unsaturated carboxylic acid and of an alkali metal salt thereof which is to be subjected to polymerization, is prepared by neutralizing an $\alpha,\beta$-unsaturated carboxylic acid with an alkali. In this case, generally the neutralization degree can be varied widely. However, the neutralization degree differs depending upon whether the polymerization for production of a water-absorbent resin is conducted in the absence of a crosslinking agent or in the presence of a crosslinking agent.

In the polymerization in the absence of a crosslinking agent, a self crosslinking reaction must take place during polymerization and a neutralization degree of 40 to 98 mole % is appropriate. When the neutralization degree is lower than 40 mole %, the self crosslinking reaction takes place to a very high extent, resulting in drastic reduction of water absorbency of the polymer formed. When the neutralization degree exceeds 98 mole %, the majority of the polymer formed becomes water-soluble.

In contrast, in the polymerization in the presence of a crosslinking agent, the self crosslinking reaction is not necessarily required during polymerization and a neutralization degree of 40 to 100 mole % is appropriate. When the neutralization degree is lower than 40 mole %, the water absorbency of the polymer formed is reduced drastically for the reason mentioned above, and the acidity of the polymer increases, which is not desirable in utilization of the polymer.

The monomer concentration in the aqueous solution of an $\alpha,\beta$-unsaturated carboxylic acid and of an alkali metal salt thereof is preferably from 25% by weight to their saturated solubility point, more preferably from 30% by weight to their saturated solubility point.

When the monomer concentration is lower than 25% by weight, the majority of the polymer produced in the absence of a crosslinking agent becomes water-soluble and the polymer yield per polymerization reactor is reduced.

In the present process, polymerization can be conducted in the presence or absence of a crosslinking agent. The water-absorbent resin produced in the presence of a crosslinking agent is characterized by having an improved gel strength. In contrast, the water-absorbent resin of self-crosslinking type produced in the absence of a crosslinking agent is characterized by having high water absorbency.

The polymerization conditions can appropriately be selected so as to best meet the application purpose of the water-absorbent resin produced, and the like. As a crosslinking agent used in the polymerization in the presence of the crosslinking agent, any crosslinking agent can be used as long as it can crosslink a polymer produced from an $\alpha,\beta$-unsaturated carboxylic acid monomer and its alkali metal salt monomer. As polymerizable crosslinking agents, there can be cited, for example, di-or tri(meth)acrylates of polyols such as ethylene glycol, propylene glycol, trimethylolpropane, glycerine, polyoxyethylene glycol, polyoxypropylene glycol, polyglycerine and the like; unsaturated polyesters obtained by reacting said polyols with unsaturated acids such as maleic acid, fumaric acid and the like; bisacrylamides such as N,N-methylenebisacrylamide and the like; di- or tri(meth)acrylates obtained by reacting a polyepoxide with (meth)acrylic acid; di-(meth)aryloyloxyethyl carbamates obtained by reacting a polyisocyanate such as tolylene diisocyanate, hexamethylene diisocyanate or the like with hydroxyethyl (meth)acrylate; allylated starch; allylated cellulose; diallyl phthalate; N, N',N''-triallylisocyanurate; divinylbenzene; etc.

Of these, there are ordinarily used ethylene glycol diacrylate, ethylene glycol dimethacrylate, diethylene glycol diacrylate, diethylene glycol dimethacrylate, propylene glycol diacrylate, propylene glycol dimethacrylate, polyethylene glycol diacrylate, polyethylene glycol dimethacrylate, diallyl phthalate, N, N',N''-triallylisocyanurate, N, N'-methylenebisacrylamide, etc.

As crosslinking agents which react with carboxyl groups present in the $\alpha,\beta$-unsaturated carboxylic acid and its alkali metal salt or their polymer, there are, for example, diglycidyl ether compounds, haloepoxy compounds and isocyanate compounds. Of these, diglycidyl ether compounds are particularly suitable. Specific examples of the diglycidyl ether compounds include (poly)ethylene glycol diglycidylether, (poly)propylene glycol diglycidyl ether and (poly)glycerine diglycidyl ether. Of these, ethylene glycol diglycidyl ether gives the most preferable effect. Specific examples of the haloepoxy compounds include epichlorohydrin, epibromohydrin and α-methylepichlorohydrin. Specific examples of the isocyanate compounds include 2,4-tolylenediisocyanate and hexamethylene diisocyanate. All of these crosslinking agents can be used in the present invention.

The crosslinking agent is generally used in an amount of 0.001 to 5% by weight, preferably 0.01 to 1% by weight. When it is used in an amount less than 0.001% by weight, the water-absorbent resin formed has no improved gel strength after it has absorbed water. When the crosslinking agent is used in an amount more than 5% by weight, the water-absorbent resin formed has remarkably reduced water absorbency, which is not desirable.

The petroleum-based hydrocarbon solvent used in the present invention is an aliphatic hydrocarbon, an alicyclic hydrocarbon or an aromatic hydrocarbon. Suitable aliphatic hydrocarbons are n-pentane, n-hexane, n-heptane, ligroin, etc. Suitable alicyclic hydrocarbons are cyclopentane, methylcyclopentane, cyclohexane, methylcyclohexane, etc. Suitable aromatic hydrocarbons are benzene, toluene, xylene, etc. Particularly, n-hexane, n-heptane, cyclohexane, benzene, toluene and xylene can be used advantageously because they are commercially uniform in quality, easily available and inexpensive.

As the radical polymerization initiator, there are properly used radical polymerization initiators generally used, such as potassium persulfate, ammonium persulfate, sodium persulfate and the like. Also, redox initiators which comprise a combination of said initiators and a sulfite or the like, may be used. The radical polymerization initiator is suitably used in an amount of 0.005 to 1.0 mole % based on monomers. When it is used in an amount less than 0.005 mole %, a very long time is required for polymerization. When it is used in an amount more than 1.0 mole %, polymerization takes place suddenly and invites danger.

The surfactant used in the polymerization of the present invention can be any polyglycerine—fatty acid ester represented by the general formula

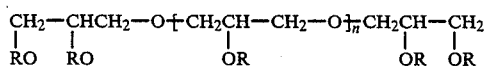

(wherein R is an acyl group or hydrogen atom and n is an integer of 0 to 8) and having an HLB of 2 to 16. More particularly, the polyglycerine—fatty acid ester is such that the fatty acid component is at least one member selected from lauric acid, palmitic acid, stearic acid, oleic acid and behenic acid. Specific examples of such a polyglycerine—fatty acid ester include diglyceryl monobehenate, diglyceryl monostearate, diglyceryl monolaurate, hexaglyceryl dipalmitate, hexaglyceryl monostearate, hexaglyceryl dioleate, hexaglyceryl monobehenate, decaglyceryl pentastearate, decaglyceryl heptastearate, etc.

When the polyglycerine—fatty acid ester has an HLB of 2 to 16, a granular polymer of 100 to 600 μm in particle diameter is obtained. When the ester of an HLB less than 2 is used, a stable emulsion can be formed but the polymer obtained becomes lumps. When the ester having an HLB more than 16 is used, the ester is difficultly soluble in petroleum-based hydrocarbon solvents and accordingly cannot sufficiently act as a surfactant. The surfactant is suitably used in an amount of 0.05 to 15% by weight, preferably 0.1 to 10% by weight based on monomers. When it is used in an amount less than 0.05% by weight, the state of stable emulsion cannot be maintained. When it is used in an amount more than 15% by weight, no advantage corresponding to the increased amount can be obtained and such an amount is uneconomical.

In inverse suspension or inverse emulsion polymerization, various surfactants have hitherto been used. In polymerization of an α,β-unsaturated carboxylic acid (or its salt), selection of an appropriate surfactant is very important in order to (a) stabilize a W/O type suspension to be polymerized and (b) appropriately control the particle size, etc. of the polymer formed.

When the polyglycerine—fatty acid ester of the present invention is used as a surfactant, droplets of an aqueous solution of monomers are dispersed uniformly in a solvent; polymerization proceeds more smoothly; and there is obtained a water-absorbent resin having a uniform and large particle diameter. Further, since the surface of the water-absorbent resin is coated with the polyglycerine—fatty acid ester, agglomeration of particles is prevented; there occurs no adhesion of the polymer to the inner wall of a reactor; and stable operation becomes possible. Furthermore, the following effects are obtained by the use of the present polyglycerine—fatty acid ester as a surfactant.

(1) Since the polyglycerine—fatty acid ester is biodegradable, there occurs no environmental pollution in production of the water-absorbent resin of the present invention and, moreover, the resin, when used in napkins, diapers, etc., is very safe to human body.

(2) Since the water-absorbent resin formed has larger particle diameters, there appears no dust in its transportation and bagging and accordingly, deterioration of working environments as well as staining and troubles of related equipments can be prevented. Hence, an excellent water-absorbent resin can be supplied economically and stably by the present invention. At the same time, applications of water-absorbent resins have become wider.

One of the most important effects provided by the present invention is that the water-absorbent resin obtained has a fast water absorption rate and excellent water retention. Further, the water-absorbent resin of the present invention has a sufficient gel strength even after it has absorbed water. Therefore, when it is used as a material for sanitation articles such as diaper, sanitary napkin and the like, there is no uncomfortable feeling of wear.

The present invention will specifically be explained below by way of Examples and Comparative Examples.

In the following Examples and Comparative Examples, water absorbency is a value obtained in accordance with the following procedures. That is, 1 g of a water-absorbent resin was dispersed in 200 ml of a 0.9% aqueous sodium chloride solution and allowed to swell sufficiently. The dispersion was then filtered through a 100 mesh wire gauze. The weight of the swollen resin obtained was measured as the water absorbency of the resin.

Water absorption rate was determined as a time required for 1 g of a water-absorbent resin to absorb 30 ml of a 0.9% aqueous sodium chloride solution.

Gel strength was measured by hand-pressing a water-absorbent resin allowed to swell to the saturation point with deionized water and by rating the result according to the following three criteria.

o: The swollen resin is not crushed even by strong pressing.

Δ: It is crushed by strong pressing.

x: It is readily crushed.

The performance of a water-absorbent resin when used in a diaper were evaluated as follows.

Preparation of absorbent

A pulp sheet weighing 100 g/m$^2$ was cut to a size of 40 cm×10 cm. On one of these cut pulp sheets was uniformly dispersed 3 g of a water-absorbent resin. On the surface of this sheet was superimposed another same pulp sheet. They were pressed by applying the pressure of 1 kg/cm$^2$ to their entire surfaces whereby an absorbent was formed.

Evaluation

One hundred and fifty ml of a 0.9% aqueous sodium chloride solution were poured around the center of the above prepared absorbent over 1 minute and the absorbent was allowed to stand for 10 minutes. Then, 20 sheets of filtering papers (Toyo Roshi No. 2) each cut to a size of 10 cm×10 cm were placed around the center of the absorbent, and 3.5 kg of a weight having a bottom area of 10 cm×10 cm was placed on the filtering papers for 3 minutes.

The amount of liquid absorbed by the filtering papers was measured to obtain an amount of liquid returned (released).

Also, the length over which the sodium chloride solution spread, was measured to obtain a diffusion length.

The absorbencies, water absorption rates, gel strengths, etc. of the water-absorbent resins obtained in the following Examples and Comparative Examples were measured and evaluated according to the above methods. The results are summarized in Table 1.

EXAMPLE 1

Two hundred and eighty ml of n-heptane were placed in a 500 ml, four-necked round bottom flask provided with a stirrer, a reflux condenser, a dropping funnel and a nitrogen-blowing tube. Further, 0.75 g of decaglyceryl pentastearate having an HLB of 3.5 (trade name: Decaglyn 5-S, produced by Nikko Chemical K.K.) was added and dispersed in n-heptane. Nitrogen gas was blown into the flask to remove oxygen dissolved in the dispersion. Then, the temperature of the dispersion was elevated to 50° C. to dissolve the surfactant in n-heptane, after which the resulting solution was cooled to 30° C.

Separately, in a 200 ml Erlenmeyer flask was placed 37.5 g of an aqueous solution containing 80% by weight of acrylic acid. With the flask being cooled with ice from outside, 49.3 g of an aqueous solution containing 25.4% by weight of sodium hydroxide was added dropwise to neutralize acrylic acid by 75 mole %. Then, 0.045 g of potassium persulfate was added and dissolved.

This aqueous solution of partially neutralized acrylic acid was added into the four-necked flask and dispersed therein. The flask inside was sufficiently purged again with nitrogen and the bath temperature was elevated to 55° to 65° C. The temperature was maintained for 1 hour to conduct polymerization. Water and n-heptane were distilled off and the residue was dried to obtain 40.0 g of a water-absorbent resin having a particle diameter of 200 to 600 μm. There was nothing adhering to the inside wall of the flask and the amount of the polymer which did not pass through a 20 mesh sieve was only 0.3 g.

EXAMPLE 2

The procedure of Example 1 was repeated except that the surfactant was changed to hexaglyceryl monobehenate having an HLB of 13.1 (trade name: Nonion GV-106, produced by Nihon Yushi K.K.) and the amount of potassium persulfate was changed to 0.19 g, whereby 40.2 g of a water-absorbent resin having a particle diameter of 150 to 500 μm was obtained. There was nothing adhering to the inside wall of the flask and the amount of the polymer which did not pass through a 20 mesh sieve was 0.8 g.

EXAMPLE 3

The procedure of Example 1 was repeated except that the surfactant was changed to diglyceryl monobehenate having an HLB of 7.8 (trade name: Nonion GV-102, produced by Nihon Yushi K.K.), whereby 40.4 g of a water-absorbent resin having a particle diameter of 200 to 600 μm was obtained. There was nothing adhering to the inside wall of the flask and the amount of the polymer which did not pass through a 20 mesh sieve was only 0.6 g.

EXAMPLE 4

The procedure of Example 1 was repeated except that the solvent was changed from n-heptane to toluene, whereby 40.2 g of a water-absorbent resin having a particle diameter of 100 to 350 μm was obtained. There was nothing adhering to the inside wall of the flask and the amount of the polymer which did not pass through a 20 mesh sieve was 0.9 g.

EXAMPLE 5

The procedure of Example 1 was repeated except that 0.012 g of ethylene glycol dimethacrylate was added as a crosslinking agent, whereby 40.1 g of a water-absorbent resin having a particle diameter of 200 to 600 μm was obtained. There was nothing adhering to the inside wall of the flask and the amount of the polymer which did not pass through a 20 mesh sieve was only 0.2 g.

EXAMPLE 6

The procedure of Example 3 was repeated except that 0.019 g of N, N'methylenebisacrylamide was added as a crosslinking agent, whereby 40.4 g of a water-absorbent resin having a particle diameter of 200 to 600 μm was obtained. There was nothing adhering to the inside wall of the flask and the amount of the polymer which did not pass through a 20 mesh sieve was 0.5 g.

EXAMPLE 7

The procedure of Example 1 was repeated except that the surfactant was changed to 2.25 g of decaglyceryl heptastearate having an HLB of 2 (trade name: Decaglyn 7-S, produced by Nikko Chemical K.K.), whereby 41.2 g of a water-absorbent resin having a particle diameter of 200 to 500 μm was obtained. There was nothing adhering to the inside wall of the flask and the amount of the polymer which did not pass thorugh a 20 mesh sieve was only 0.05 g.

EXAMPLE 8

The procedure of Example 3 was repeated except that the solvent was changed from n-heptane to cyclohexane and 0.038 g of N, N-methylenebisacrylamide was added as a crosslinking agent, whereby 40.0 g of a water-absorbent resin having a particle diameter of 150 to 500 μm was obtained. There was nothing adhering to the inside wall of the flask and the amount of the polymer which did not pass through a 20 mesh sieve was 0.7 g.

EXAMPLE 9

The procedure of Example 2 was repeated except that 0.019 g of ethylene glycol diglycidyl ether was added as a crosslinking agent, whereby 40.4 g of a water-absorbent resin having a particle diameter of 150 to 500 μm was obtained. There was nothing adhering to the inside wall of the flask and the amount of the polymer which did not pass through a 20 mesh sieve was 0.5 g.

EXAMPLE 10

The procedure of Example 2 was repeated except that 0.012 g of epichlorohydrin was added as a crosslinking agent, whereby 40.5 g of a water-absorbent resin having a particle diameter of 150 to 500 μm was obtained. There was nothing adhering to the inside wall of the flask and the amount of the polymer which did not pass through a 20 mesh sieve was 0.7 g.

EXAMPLE 11

The procedure of Example 2 was repeated except that 0.038 g of hexamethylene diisocyanate was added as a crosslinking agent, whereby 40.5 g of a water-absorbent resin having a particle diameter of 150 to 500 μm was obtained. There was nothing adhering to the inside wall of the flask and the amount of the polymer which did not pass through a 20 mesh sieve was 0.6 g.

EXAMPLE 12

The procedure of Example 5 was repeated except that 37.5 g of the aqueous solution containing 80% by weight of acrylic acid was changed to 30 g of methacrylic acid and that 49.3 g of the aqueous solution containing 25.4% by weight of sodium hydroxide was changed to 54.1 g of an aqueous solution containing 19.3% by weight of sodium hydroxide, whereby 39.5 g of a water-absorbent resin having a particle diameter of 100 to 400 μm was obtained. There was nothing adhering to the inside wall of the flask and the amount of the polymer which did not pass through a 20 mesh sieve was 0.4 g.

EXAMPLE 13

The procedure of Example 5 was repeated except that 63.1 g of an aqueous solution containing 23.7% by weight of sodium hydroxide was added dropwise to neutralize acrylic acid by 90 mole %, whereby 41.5 g of a water-absorbent resin having a particle diameter of 150 to 600 μm was obtained. There was nothing adhering to the inside wall of the flask and the amount of the polymer which did not pass through a 20 mesh sieve was only 0.3 g.

EXAMPLE 14

The procedure of Example 1 was repeated except that 57.4 g of an aqueous solution containing 32.6% by weight of potassium hydroxide was added dropwise to neutralize acrylic acid by 80 mole %, whereby 45.5 g of a water-absorbent resin having a particle diameter of 150 to 500 μm was obtained. There was nothing adhering to the inside wall of the flask and the amount of the polymer which did not pass through a 20 mesh sieve was only 0.3 g.

EXAMPLE 15

The procedure of Example 1 was repeated except that 31.7 g of an aqueous solution containing 26.8% by weight of sodium hydroxide was added dropwise to neutralize acrylic acid by 50 mole %, whereby 36.4 g of a water-absorbent resin having a particle diameter of 150 to 500 μm was obtained. There was nothing adhering to the inside wall of the flask and the amount of the polymer which did not pass through a 20 mesh sieve was only 0.4 g.

EXAMPLE 16

The procedure of Example 7 was repeated except that the amount of potassium persulfate was changed to 0.11 g, whereby 41.0 g of a water-absorbent resin having a particle diameter of 200 to 600 μm was obtained. There was nothing adhering to the inside wall of the flask and the amount of the polymer which did not pass through a 20 mesh sieve was only 0.1 g.

EXAMPLE 17

The procedure of Example 1 was repeated except that the surfactant was changed to hexaglyceryl dipalmitate having an HLB of 15.8 (trade name: Nonion GP-206, produced by Nihon Yushi K.K.), whereby 40.0 g of a water-absorbent resin having a particle diameter of 100 to 300 μm was obtained. There was nothing adhering to the inside wall of the flask and the amount of the polymer which did not pass through a 20 mesh sieve was only 0.2 g.

COMPARATIVE EXAMPLE 1

The procedure of Example 1 was repeated except that the surfactant was changed to hexaglyceryl monolaurate having an HLB of 18.2 (trade name: Nonion GL-106, produced by Nihon Yushi K.K.), whereby 40.8 g of a water-absorbent resin having a particle diameter of 500 to 5,000 μm was obtained. There was nothing adhering to the inside wall of the flask and the amount of the polymer which did not pass through a 20 mesh sieve was 37 g.

COMPARATIVE EXAMPLE 2

The procedure of Example 1 was repeated except that the surfactant was changed to 1.8 g of sorbitan monostearate, whereby 41.8 g of a water-absorbent resin having a particle diameter of 20 to 80 μm was obtained. There was nothing adhering to the inside wall of the flask and the amount of the polymer which did not pass through a 20 mesh sieve was only 0.3 g.

COMPARATIVE EXAMPLE 3

The procedure of Example 1 was repeated except that the surfactant was changed to 0.56 g of sorbitan monolaurate and the addition amount of potassium persulfate was changed to 0.19 g, whereby 37.0 g of a water-absorbent resin having a particle diameter of 150 to 500 μm was obtained. The amount of the substance adhering to the inside wall of the flask was 2.0 g and the amount of the polymer which did not pass thorough a 20 mesh sieve was 1.5 g.

COMPARATIVE EXAMPLE 4

The procedure of Example 1 was repeated except that the surfactant was changed to 1.8 g of ethyl cellulose (trade name: Ethyl Cellulose N-200, produced by Hercules Co.), whereby 26.9 g of a water-absorbent resin having a particle diameter of 100 to 350 μm was obtained. The amount of the substance adhering to the inside wall of the flask was 8.1 g and the amount of the polymer which did not pass through a 20 mesh sieve was 6.5 g.

COMPARATIVE EXAMPLE 5

The procedure of Example 1 was repeated except that the surfactant was changed to glyceryl monostearate having an HLB of 13.0 (trade name: Monogly, produced by Nihon Yushi K.K.). As soon as the polymerization was initiated, the suspension state of the polymerization liquid was destroyed and only lumpy polymerization product was obtained.

TABLE 1

| | Water absorbency (g/g) | Water absorption rate (min) | Gel strength | Diaper evaluation | |
|---|---|---|---|---|---|
| | | | | Amount of liquid returned (g) | Diffusion length (cm) |
| Example 1 | 82 | 3 min 40 sec | Δ | 5.4 | 34 |
| Example 2 | 68 | 2 min 10 sec | o | 4.0 | 33 |
| Example 3 | 80 | 3 min 10 sec | Δ | 5.0 | 33 |
| Example 4 | 84 | 2 min 50 sec | Δ | 4.8 | 31 |
| Example 5 | 72 | 1 min 40 sec | o | 1.3 | 32 |
| Example 6 | 70 | 1 min 20 sec | o | 1.2 | 32 |
| Example 7 | 81 | 2 min | Δ | 3.4 | 34 |
| Example 8 | 59 | 50 sec | o | 2.5 | 30 |
| Example 9 | 68 | 1 min 10 sec | o | 1.5 | 32 |
| Example 10 | 68 | 1 min 20 sec | o | 1.5 | 32 |
| Example 11 | 65 | 1 min | o | 1.3 | 32 |
| Example 12 | 53 | 1 min | o | 4.0 | 30 |
| Example 13 | 80 | 2 min 30 sec | o | 2.0 | 34 |
| Example 14 | 75 | 2 min 40 sec | Δ | 3.9 | 33 |
| Example 15 | 58 | 1 min | o | 3.8 | 30 |
| Example 16 | 71 | 2 min 20 sec | o | 1.5 | 32 |
| Example 17 | 84 | 3 min 50 sec | Δ | 6.0 | 32 |
| Comparative Example 1 | 85 | 25 min (unswollen powder lump) | x | 10.7 | 24 |
| Comparative Example 2 | 46 | 65 min (unswollen powder lump) | o | 15.5 | 17 |
| Comparative Example 3 | 90 | 20 min (unswollen powder lump) | x | 9.5 | 21 |
| Comparative Example 4 | 75 | 17 min (unswollen powder lump) | Δ | 8.0 | 25 |
| Comparative Example 5 | — | — | — | — | — |

We claim:

1. A process for producing a water-absorbent resin wherein an aqueous solution containing an $\alpha,\beta$-unsaturated carboxylic acid and an alkali metal salt thereof in a total amount of 25% by weight or more is subjected to polymerization with a radical polymerization initiator in a petroleum-based hydrocarbon solvent in the presence or absence of a crosslinking agent, characterized by using, as a surfactant, a polyglycerine—fatty acid ester having an HLB of 2 to 16 and represented by the general formula

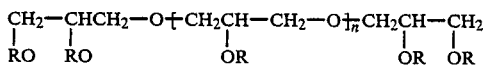

(wherein R is an acyl group or hydrogen atom and n is an integer of 0 to 8).

2. A process according to claim 1, wherein the $\alpha,\beta$-unsaturated carboxylic acid is acrylic acid.

3. A process according to claim 1, wherein the mole concentration of the alkali metal salt of the $\alpha,\beta$-unsaturated carboxylic acid in the total amount of the $\alpha,\beta$-unsaturated carboxylic acid and the alkali metal salt thereof is 40% or more.

4. A process according to claim 1, wherein the petroleum-based hydrocarbon solvent is at least one member selected from the group consisting of n-hexane, n-heptane, cyclohexane, benzene, toluene and xylene.

5. A process according to claim 4, wherein the petroleum-based hydrocarbon solvent is n-heptane.

6. A process according to claim 1, wherein the radical polymerization initiator is potassium persulfate.

7. A process according to claim 1, wherein the crosslinking agent is N, N-methylenebisacrylamide.

8. A process according to claim 1, wherein the crosslinking agent is ethylene glycol diglycidyl ether.

9. A process according to claim 1, wherein the polyglycerine—fatty acid ester is diglyceryl monobehenate.

10. A process according to claim 1, wherein the polyglycerine—fatty acid ester is hexaglyceryl monobehenate.

11. A process according to claim 1, wherein the polyglycerine—fatty acid ester is decaglyceryl pentastearate.

12. A process according to claim 1, wherein the polyglycerine—fatty acid ester is decaglyceryl heptastearate.

13. A process according to claim 1, wherein the polyglycerine—fatty acid ester is used in an amount of 0.1 to 10% by weight based on the total amount of the $\alpha,\beta$-unsaturated carboxylic acid and the alkali metal salt thereof.

* * * * *